(12) United States Patent
Strobel et al.

(10) Patent No.: US 12,463,841 B2
(45) Date of Patent: Nov. 4, 2025

(54) COPPER BACKHAUL FOR HYBRID FIBER COAXIAL NETWORKS

(71) Applicant: MAXLINEAR ASIA SINGAPORE PRIVATE LIMITED, Singapore (SG)

(72) Inventors: Rainer Strobel, Munich (DE); Thushara Hewavithana, Chandler, AZ (US)

(73) Assignee: MAXLINEAR ASIA SINGAPORE PRIVATE LIMITED, Singapore (SG)

(*) Notice: Subject to any disclaimer, the term of this patent is extended or adjusted under 35 U.S.C. 154(b) by 844 days.

(21) Appl. No.: 17/434,699

(22) PCT Filed: Feb. 26, 2020

(86) PCT No.: PCT/US2020/019838
§ 371 (c)(1),
(2) Date: Aug. 27, 2021

(87) PCT Pub. No.: WO2020/176587
PCT Pub. Date: Sep. 3, 2020

(65) Prior Publication Data
US 2022/0173923 A1 Jun. 2, 2022

Related U.S. Application Data

(60) Provisional application No. 62/811,030, filed on Feb. 27, 2019.

(51) Int. Cl.
*H04L 12/28* (2006.01)
*H04L 5/14* (2006.01)

(52) U.S. Cl.
CPC ............ *H04L 12/2801* (2013.01); *H04L 5/14* (2013.01)

(58) Field of Classification Search
CPC ....... H04L 12/2801; H04L 5/14; H04L 41/12; H04L 5/0064
See application file for complete search history.

(56) References Cited

U.S. PATENT DOCUMENTS

| | | | |
|---|---|---|---|
| 7,058,007 B1 | 6/2006 | Daruwalla et al. |
| 2002/0078464 A1 | 6/2002 | Dravida et al. |

(Continued)

FOREIGN PATENT DOCUMENTS

| | | |
|---|---|---|
| CN | 1416239 A | 5/2003 |
| CN | 101166135 A | 4/2008 |

(Continued)

OTHER PUBLICATIONS

International Search Report and Written Opinion in PCT/US2020/019838 mailed Jun. 19, 2020.

(Continued)

*Primary Examiner* — Anez C Ebrahim
(74) *Attorney, Agent, or Firm* — Buchalter; Jason W. Croft

(57) ABSTRACT

An active cable node circuit associated with a hybrid fiber coax network is disclosed. The active cable node circuit comprises an uplink transceiver circuit configured to couple to an aggregation node circuit over a first coax cable link comprising coaxial cables and receive a set of downstream data signals from the aggregation node circuit. In some embodiments, the active cable node circuit further comprises one or more access transceiver circuits configured to provide the set of downstream data signals received at the uplink transceiver circuit or a processed version thereof, to one or more access circuits. In some embodiments, each of the one or more access transceiver circuits is configured to couple to the uplink transceiver circuit at a first end, and couple to a set of access circuits of the one or more access (Continued)

circuits at a second, different end, over a second coax cable link.

20 Claims, 10 Drawing Sheets

(56) References Cited

U.S. PATENT DOCUMENTS

| | | | |
|---|---|---|---|
| 2004/0187156 | A1 | 9/2004 | Palm et al. |
| 2011/0255452 | A1* | 10/2011 | Brooks ............... H04L 12/2801 370/297 |
| 2012/0093204 | A1 | 4/2012 | Al-Dhahir et al. |
| 2013/0332978 | A1 | 12/2013 | Rakib |
| 2015/0172072 | A1 | 6/2015 | Rakib |
| 2017/0070409 | A1* | 3/2017 | Lv ..................... H04B 10/0793 |
| 2018/0287660 | A1 | 10/2018 | Arambepola et al. |
| 2018/0294941 | A1 | 10/2018 | Chapman et al. |
| 2018/0351268 | A1 | 12/2018 | Krapp et al. |
| 2019/0182515 | A1* | 6/2019 | Kim ................... H04N 21/6118 |
| 2019/0229768 | A1* | 7/2019 | Jeremy ................... H04B 3/44 |
| 2019/0268037 | A1* | 8/2019 | Ramesh ................... H04B 3/23 |
| 2019/0289038 | A1* | 9/2019 | Li ......................... H04L 9/3215 |
| 2019/0379921 | A1* | 12/2019 | Zinevich ................. H04B 3/46 |
| 2020/0136793 | A1 | 4/2020 | Strobel |
| 2020/0252249 | A1* | 8/2020 | Finkelstein ......... H04L 12/6418 |

FOREIGN PATENT DOCUMENTS

| | | |
|---|---|---|
| CN | 201491166 U | 5/2010 |
| CN | 101882960 A | 11/2010 |
| CN | 102387334 A | 3/2012 |
| CN | 104836712 A | 8/2015 |
| CN | 107548538 A | 1/2018 |
| CN | 108712192 A | 10/2018 |
| WO | 2016086294 A1 | 6/2016 |
| WO | 2018085995 A1 | 5/2018 |
| WO | 2018167217 A1 | 9/2018 |
| WO | 2020176587 A1 | 9/2020 |

OTHER PUBLICATIONS

First Office Action issued in Chinese Patent Application No. 2020800301375 mailed Aug. 2, 2022.

Haiyong Z., et al., "C-DOCSIS Networking Scheme of the System in the Cable Television Network," China Cable TV, Jun. 2013, 3 pgs with Abstract translation.

International Preliminary Report on Patentability for International Application No. PCT/US2020/019838, mailed Sep. 10, 2021, 8 Pages.

Mohui X., et al., "CMTS Head-End Automatic Login and Viewing Program Design," Cable TV Technology, Jun. 2009, 4 pgs with Abstract translation.

Notice of Allowance for Chinese Patent Application No. 202080030137.5 dated Jan. 29, 2023, 6 pgs.

* cited by examiner

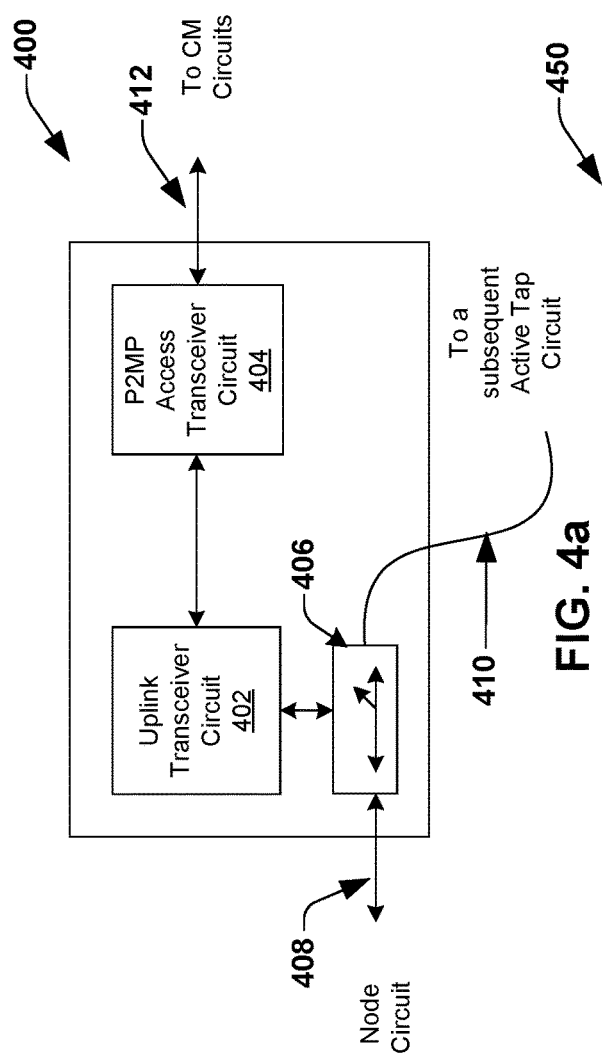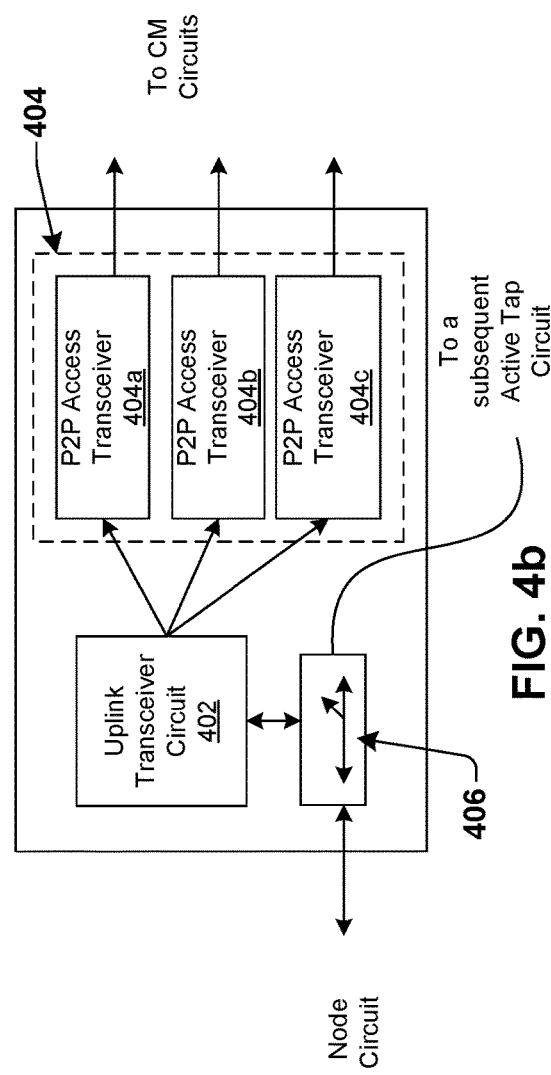

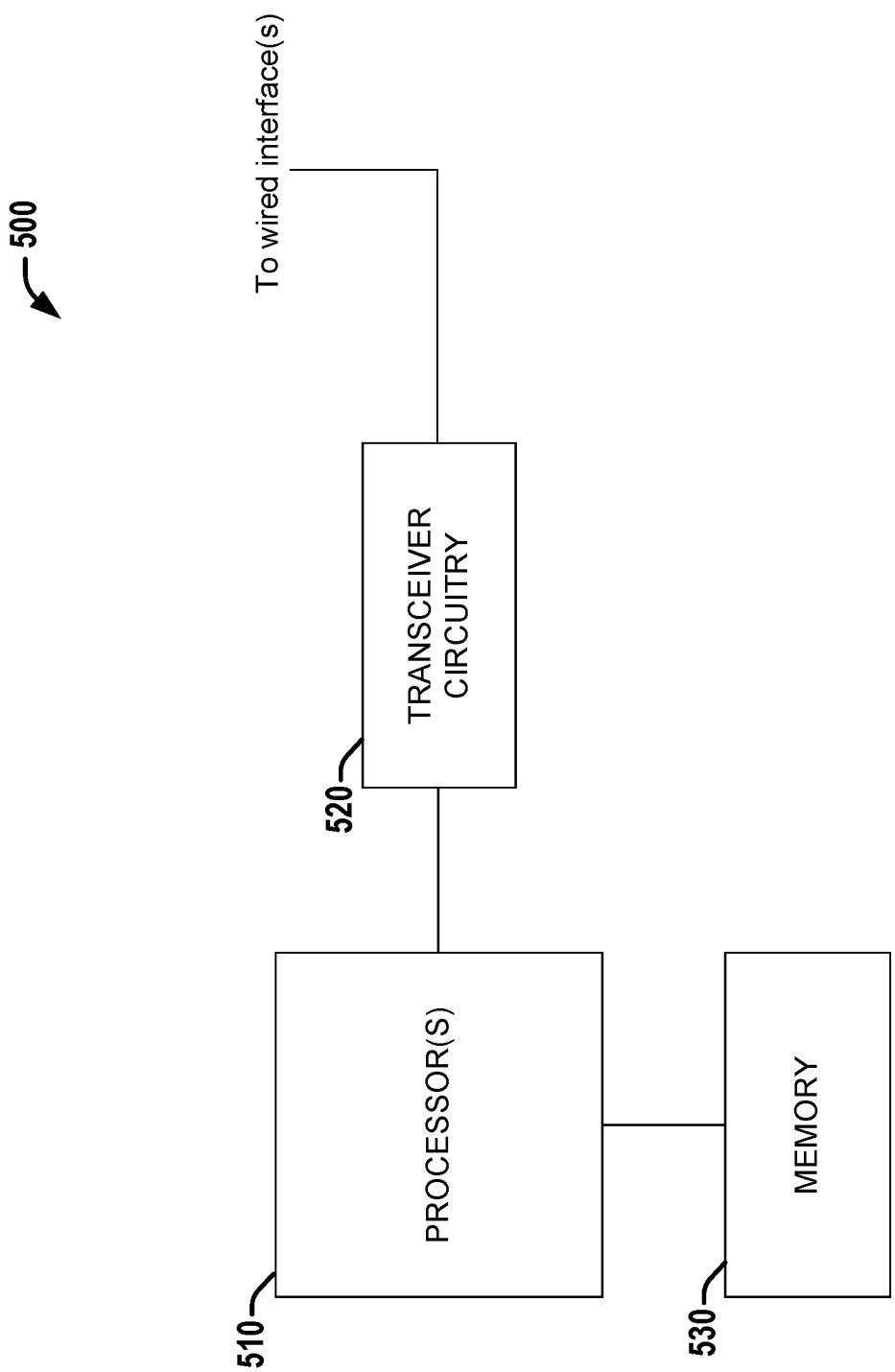

COPPER BACKHAUL FOR HYBRID FIBER COAXIAL NETWORKS

REFERENCE TO RELATED APPLICATIONS

This application claims the benefit of provisional Application No. 62/811,030, filed Feb. 27, 2019, entitled "COPPER BACKHAUL FOR HYBRID FIBER COAXIAL NETWORKS", contents of which are herein incorporated by reference in their entirety.

FIELD

The present disclosure relates to hybrid fiber coaxial networks, and in particular, to a network topology that utilizes copper backhaul in hybrid fiber coaxial networks.

BACKGROUND

The next generation data over cable service interface specification (DOCSIS) standard for Hybrid Fiber Coax (HFC) technology will be based on Full Duplex (FDX). FDX is made possible by natural migration of HFC plant to N+0 architecture, which brings fiber to the last amplifier in the HFC, to increase the capacity available per user. In N+0 architecture, the last amplifier is replaced by a Remote PHY Device (RPD) or node, which implements the physical layer (PHY) and possible some limited media access control (MAC) layer functions of the DOCSIS Cable Modem Termination System (CMTS) headend system. The network which connects remote PHY (RPHY), or the node, to Cable Modems (CMs) is entirely passive in this network architecture and therefore it is possible to have a full duplex (FDX) communication between the RPHY and the CMs.

BRIEF DESCRIPTION OF THE DRAWINGS

Some examples of circuits, apparatuses and/or methods will be described in the following by way of example only. In this context, reference will be made to the accompanying Figures.

FIG. 4a illustrates a simplified block diagram of an active tap circuit, according to one embodiment of the disclosure.

FIG. 4b illustrates a simplified block diagram of an active tap circuit comprising 3 P2P access transceiver circuits, according to one embodiment of the disclosure.

FIG. 5 illustrates a simplified block diagram of an apparatus for use in an active node circuit associated with a wireline communication system, according to various embodiments described herein.

DETAILED DESCRIPTION

Figure 1:
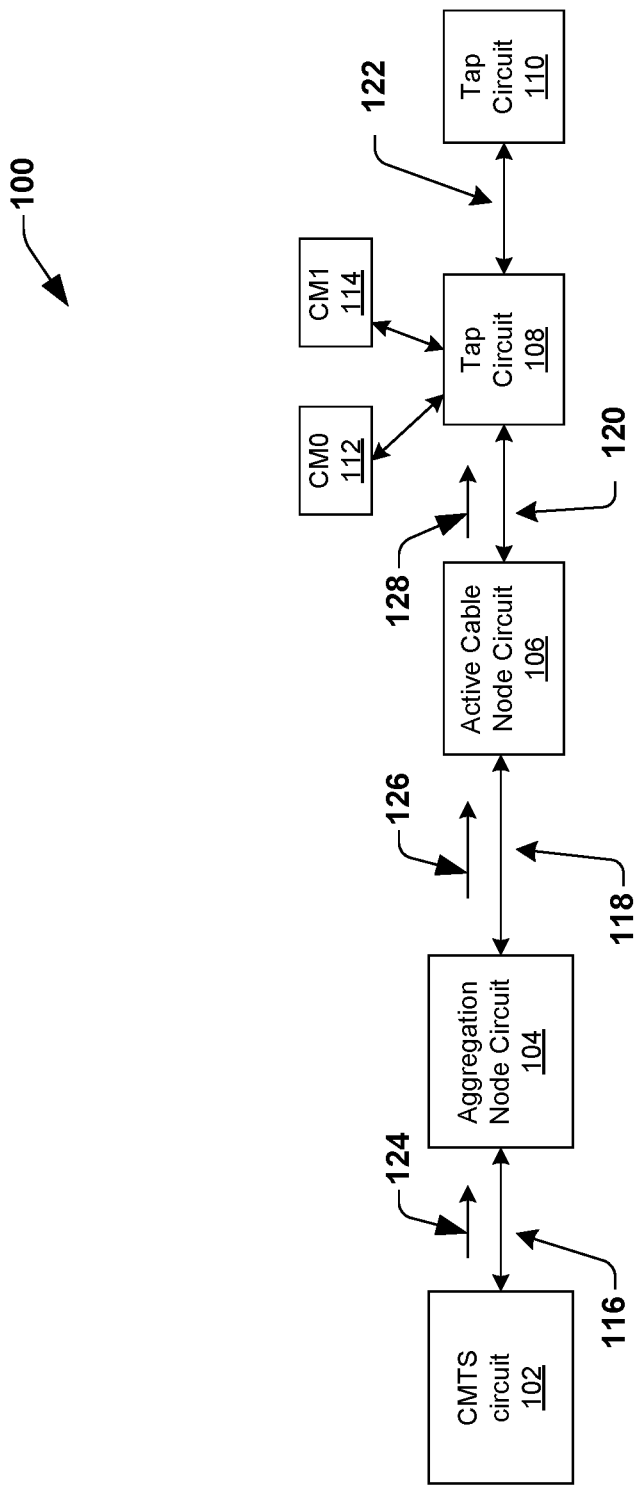
FIG. 1 illustrates a simplified block diagram of a hybrid fiber coax (HFC) network, according to one embodiment of the disclosure.

In one embodiment of the disclosure, an active cable node circuit associated with a hybrid fiber coax network is disclosed. The active cable node circuit comprises an uplink transceiver circuit configured to couple to an aggregation node circuit over a first coax cable link comprising coaxial cables and configured to receive a set of downstream data signals from the aggregation node circuit over the first coax cable link. The active cable node circuit further comprises one or more access transceiver circuits configured to provide the set of downstream data signals received at the uplink transceiver circuit or a processed version thereof, to one or more access circuits. In some embodiments, each of the one or more access transceiver circuits is configured to couple to the uplink transceiver circuit at a first end, and wherein each of the one or more access transceiver circuits is configured to couple to a set of access circuits of the one or more access circuits at a second, different end. In some embodiments, each of the one or more access transceiver circuits is configured to couple to the set of access circuits over a second coax cable link comprising coaxial cables.

In one embodiment of the disclosure, an active tap circuit associated with a hybrid fiber coax network is disclosed. The active tap circuit comprises an uplink transceiver circuit configured to couple to an active node circuit, over a first coax cable link comprising coaxial cables and receive a set of downstream data signals associated with a set of cable modem (CM) circuits associated therewith, from the active node circuit over the first coax cable link. In some embodiments, the active tap circuit further comprises one or more access transceiver circuits configured to provide the set of downstream data signals received at the uplink transceiver circuit or a processed version thereof, to the set of CM circuits, respectively, over a second coax cable link comprising coaxial cables. In some embodiments, each of the one or more access transceiver circuits is configured to couple to the uplink transceiver circuit at a first end, and wherein each of the one or more access transceiver circuits is configured to couple to one or more CM circuits of the set of CM circuits at a second, different end, over the second coax cable link. In some embodiments, the active tap circuit further comprises a coupler circuit configured to couple to the first coax cable link at a first end and to the uplink transceiver circuit at a second, different end, in order to couple the uplink transceiver circuit to the active node circuit.

In one embodiment of the disclosure, a aggregation node circuit associated with a hybrid fiber coax network is disclosed. In some embodiments, the aggregation node circuit is configured to couple to a cable modem termination system (CMTS) circuit over fiber. In some embodiments, the aggregation node circuit comprises a memory configured to store a plurality of instructions; and one or more processors configured to retrieve the plurality of instructions from the memory. In some embodiments, the one or more processors, upon execution of the plurality of instructions is configured to process a set of downstream data signals received from the CMTS circuit over fiber, via a transceiver circuit; and provide a processed version of the set of downstream data signals to one or more active node circuits over coax cables, via the transceiver circuit, in order to provide the processed version of the set of downstream data signals to a set of cable modem circuits, respectively, coupled to the one or more active node circuits.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, it is possible to have a full duplex (FDX) communication between the RPHY and the cable modems (CMs) in N+0 architecture. In some embodiments, RPHY refers to a node circuit associated with a hybrid fiber coax (HFC) network. However, bringing fiber to the last amplifier or to the tap is costly and very time consuming, even more so than Multiple-System Operators (MSOs) initially expected. As a result of that, MSOs have scaled down on their initial plans of taking fiber deep into network reducing the foot print of the network where DOCSIS FDX can be deployed. Furthermore, this could also delay the deployment of full duplex DOCSIS altogether. Hence, we need a cost-effective way of increasing the footprint of network where DOCSIS FDX can be deployed. Cost of taking fiber deep to second last (node+1) or third last (node+2) amplifier has significantly lower cost per households passed (HHP) compared to node+0. Therefore, the MSOs see node+1, node+2 as more likely fiber deep scenario whereas node+0 been deployed selectively in areas where the demand justifies additional cost. To make DOCSIS FDX viable in a such a network, we need to expand DOCSIS FDX deployability to active networks, in particular node+1 node+2.

Previous solutions to deploy DOCSIS FDX include bringing fiber to the last amplifier, which is proving to be prohibitive from cost and effort point of view. Before full duplex DOCSIS was introduced, it was possible to have amplifiers in the network to recover the signal. These amplifiers come with the disadvantage that full duplex cannot be supported. In addition, the amplifier distortion adds up for each additional amplifier stage and to avoid distortion limiting data rate requires high linearity of the amplifiers leading to high power consumption. There are solutions allowing to re-use the existing coaxial cable to connect the node+0 node, but they rely on a point-to-point connection and thus, deployment flexibility is very limited. Full Duplex amplifiers are also being considered as possible solution for enabling DOCSIS FDX in active HFC networks. Technical feasibility of FDX Amps are yet to be demonstrated. There are also significant limitations with FDX Amplifier approach, for example, each cascade stage of FDX amplifiers degrade capacity as a result of residual echoes and amplifier noise/distortions floors. Further, by using a single RPHY node, capacity of the node is limited to the capacity of one FDX node (therefore all the CMs connected to n+x active node is sharing single FDX node capacity).

In order to overcome the above disadvantages, an active node circuit that uses copper trunk cable as a backhaul connection to connect with an Extended Spectrum DOCSIS (ESD) node, while allowing point-to-multipoint connections in the link between the ESD node and the active node circuit, is proposed herein. In some embodiments, fiber is brought to the ESD node. For example, ESD could be placed at the head of previous node+1, or node+2 segments of network in line with more likely fiber deep scenarios. In order to implement FDX in n+1 and n+2 scenarios, in one embodiment, an active cable node circuit comprising an FDX node in place of a last amplifier in n+1 or n+2 networks is introduced. In particular, last amplifiers in n+1 or n+2 scenarios are replaced with FDX nodes, with ESD to FDX nodes having a point to multipoint connection. ESD node could be built to use 3+GHz spectrum and potentially offer capacity equivalent to multiple FDX nodes. This is a key advantage of this solution over FDX Amp solutions. Alternately, in another embodiment, the active tap circuits comprising FDX nodes are implemented in the taps in the network.

By implementing an active node circuit with copper backhaul, cost of deployment of fiber to the last amplifier or to the tap is saved, while having the benefits of bringing an active node close to the subscribers. In some embodiments, an active node circuit refers to a device comprising one or more transceivers that performs physical layer tasks like modulation, signal processing, amplifying etc. In some embodiments, the active node circuits are different from cable modem circuits. In terms of signal quality, the coaxial trunk cable can achieve the data rates of a fiber connection, but it is limited in reach, compared to a fiber connection (e.g., comparing to a 25G-PON connection). By using the active node circuit with copper backhaul, in some embodiments, the overall link will have a lower attenuation and the signal is fully regenerated such that neither noise nor distortion add up over the transmission links, but only uncorrectable transmission errors. In some embodiments, the connection between the active node and cable modems (CMs) is passive, allowing full duplex transmission to the CM. With this architecture, it is easier to maintain coexistence with legacy technologies, because the (legacy) CMs are decoupled from a potential new transmission technology on the backhaul link.

FIG. 1 illustrates a simplified block diagram of a hybrid fiber coax (HFC) network 100, according to one embodiment of the disclosure. The HFC network 100 comprises a cable modem termination system (CMTS) circuit 102, an aggregation node circuit 104, an active cable node circuit 106, a first tap circuit 108 and a second tap circuit 110. In some embodiments, the CMTS circuit 102 comprises a transceiver or a communication device that is located at a head end or a central office of the HFC network 100. In some embodiments, the CMTS circuit 102 is configured to provide a set of downstream data signals 124 to the aggregation node circuit 104. In some embodiments, the set of downstream data signals comprises data signals that are directed from a CMTS circuit towards cable modem (CM) circuits. In some embodiments, the CMTS circuit 102 is configured to provide the set of downstream data signals 124 to the aggregation node circuit 104 over a fiber link 116. In some embodiments, the fiber link 116 comprises one or more fiber optic cables or fiber. In some embodiments, the aggregation node circuit 104 comprises a transceiver or a communication device that is located away from the head end (closer to the subscribers) and is coupled to the CMTS circuit 102 over the fiber link 116. In some embodiments, the aggregation node circuit 104 comprises an active node circuit comprising one or more transceivers/processors configured to amplify/process data signals.

In some embodiments, the set of downstream data signals 124 is associated with a set of cable modem (CM) circuits associated with the HFC network 100. In some embodiments, the aggregation node circuit 104 is configured to receive the set of downstream data signals 124 from the CMTS circuit 102 over the fiber link 116 and process the set of downstream data signals 124, in order to form the set of downstream data signals 126. In some embodiments, the aggregation node circuit 104 is further configured to provide the set of downstream data signals 126 to the active cable node circuit 106 over a first coax cable link 118. In some embodiments, the aggregation node circuit 104 comprises an extended spectrum data over cable service interface specification (ESD) node configured to communicate with the active cable node circuit 106 using an ESD transmission scheme (e.g., with 3 GHz bandwidth).

In some embodiments, the first coax cable link 118 comprise one or more coax cables. In some embodiments, the set of downstream data signals 126 comprises a processed version of the set of downstream data signals 124. In particular, in some embodiments, the set of downstream data signals 124 comprises optical signals and the set of downstream data signals 126 comprises electrical signals. In this embodiment, the aggregation node circuit 104 is shown to provide the set of downstream data signals 126 to a single active cable node circuit 106 over the first coax cable link 118. However, in some embodiments, the active cable node circuit 106 may comprise one or more active cable node circuits. Therefore, in such embodiments, the aggregation node circuit 104 may be configured to provide the set of downstream data signals 126 to the one or more active cable node circuits (not shown for clarity) over the first coax cable link 118. In some embodiments, a splitter circuit (not shown) may be utilized to split the set of downstream data signals 126 between the one or more active cable node circuits.

In some embodiments, the active cable node circuit 106 is configured to couple to the aggregation node circuit 104 over the first coax cable link 118 and receive the set of downstream data signals 126 from the aggregation node circuit 104 over the coax cable link 118. In some embodiments, the active cable node circuit 106 comprises a transceiver or a communication device that is located at a location closer to the subscribers than the aggregation node circuit 104 and comprises a copper backhaul link (i.e., the first coax cable link 118) to couple to the aggregation node circuit 104. In some embodiments, the active cable node circuit 106 comprises an active node circuit comprising one or more transceivers/processors configured to amplify/process data signals.

Upon receiving the set of downstream data signals 126, in some embodiments, the active cable node circuit 106 is further configured to provide a set of downstream data signals 128 to an access circuit (e.g., the tap circuit 108) over a second coax cable link 120 comprising one or more coaxial cables. In some embodiments, the set of downstream data signals 128 and the set of downstream data signals 126 are the same. Alternately, in some embodiments, the set of downstream data signals 128 comprises a processed/amplified version of the set of downstream data signals 126. In particular, in some embodiments, the active cable node circuit 106 performs one or more physical layer functions like modulation, signal processing, amplifying etc. on the set of downstream data signals 126, using the transceivers/processors associated therewith, to form the set of downstream data signals 128. In some embodiments, the active cable node circuit 106 enables to recover the signal quality, remove noise etc. associated with the set of downstream data signals 126. In some embodiments, the first coax cable link 118 and the second coax cable link 120 comprise a passive link comprising no trunk amplifiers coupled thereon. In some embodiments, the trunk amplifiers refer to any amplifier configured to amplify the downstream data signals. In some embodiments, the active cable node circuit 106 comprises a full duplex (FDX) node that supports FDX communication between the aggregation node circuit 104 and the access circuit. In some embodiments, the active cable node circuit 106 comprises a PHY circuit configured to decode physical layer protocol associated with the HFC network 100 and forward media access control (MAC) layer protocol without changes.

In this embodiment, the access circuit comprises the tap circuit 108 that is coupled to CM0 112 and CM1 114. Alternately, in other embodiments, the access circuit may comprise a cable modem (CM) circuit. Further, in some embodiments, the active cable node circuit 106 may be configured to provide the set of downstream data signals 128 to one or more access circuits. In some embodiments, the one or more access circuits may comprise one or more tap circuits. Alternately, in some embodiments, the one or more access circuits may comprise one or more CM circuits. Further, in some embodiments, the one or more access circuits may comprise one or more CM circuits and one or more tap circuits. In some embodiments, the tap circuit 108 may comprise a coupler circuit (not shown) configured to provide a first subset of the set of downstream data signals 128 to the CM0 112 and the CM1 114. In some embodiments, the coupler circuit may be further configured to provide a second different subset of the set of downstream data signals 128 to a subsequent tap circuit (e.g., the tap circuit 110) over coax cables 122. In embodiments, the tap circuits 108, 110 etc. comprise passive tap circuits configured to convey data signals without processing/amplifying the data signals.

Figure 2:
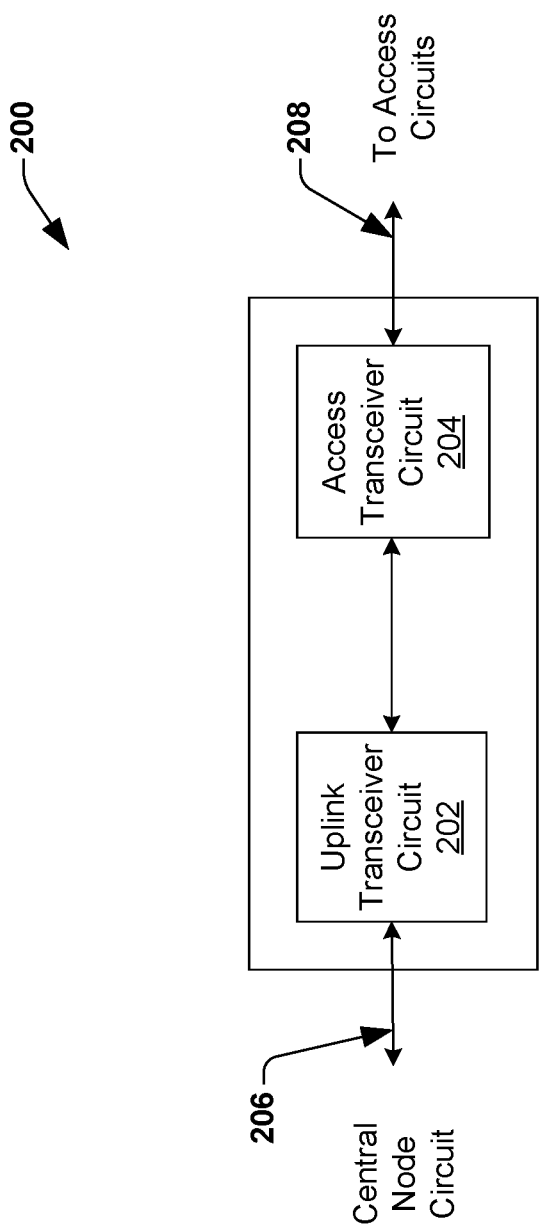
FIG. 2 illustrates a simplified block diagram of an active cable node circuit, according to one embodiment of the disclosure.

In some embodiments, the active cable node circuit 106 may comprise one or more transceiver circuits as illustrated in FIG. 2. In particular, FIG. 2 illustrates a simplified block diagram of an active cable node circuit 200, according to one embodiment of the disclosure. In some embodiments, the active cable node circuit 200 can be included within the active cable node circuit 106 in FIG. 1. Therefore, the active cable node circuit 200 is explained herein with reference to the HFC network 100 in FIG. 1. The active cable node circuit 200 comprises an uplink transceiver circuit 202 and an access transceiver circuit 204 that is coupled to the uplink transceiver circuit 202. Although not shown, the active cable node circuit 200 may further comprise one or more processors/memory circuit coupled to the uplink transceiver circuit 202 and the access transceiver circuit 204. In some embodiments, the uplink transceiver circuit 202 comprises a point to multipoint transceiver. In some embodiments, the access transceiver circuit 204 comprise one or more access transceiver circuits coupled to the uplink transceiver circuit 202. In some embodiments, each of the one or more access transceiver circuits comprises a point to multipoint (P2MP) transceiver. Alternately, in other embodiments, each of the one or more access transceiver circuits associated with the access transceiver circuit 204 comprises a point to point (P2P) transceiver.

In some embodiments, the uplink transceiver circuit 202 is configured to couple to an aggregation node circuit (e.g., the aggregation node circuit 104 in FIG. 1) over a first coax cable link 206 (e.g., the coax cable link 118 in FIG. 1) comprising coaxial cables and configured to receive a set of downstream data signals (e.g., the set of downstream data signals 126 in FIG. 1) from the aggregation node circuit over the coaxial cables. In some embodiments, the access transceiver circuit 204 is configured to couple to the uplink transceiver circuit 202 at a first end, and couple to a second coax cable link 208 (e.g., the coax cable link 120 in FIG. 1) comprising coaxial cables at a second different end, in order to provide a set of downstream data signals (e.g., the set of downstream data signals 128 in FIG. 1) to one or more access circuits (e.g., the tap circuit 108 in FIG. 1) over the second coax cable link 208.

In the embodiments where the access transceiver circuit 204 comprises one or more access transceiver circuits, each of the one or more access transceiver circuits is configured to couple to the uplink transceiver circuit 202 at a first end, and wherein each of the one or more access transceiver circuits is configured to couple to the second coax cable link 208 comprising coaxial cables at a second different end, in order to provide the set of downstream data signals received at the uplink transceiver circuit 202 or a processed version thereof to one or more access circuits associated therewith. In some embodiments, the set of downstream signals provided to the one or more access circuits from the access transceiver circuit 204 comprises a processed version of the set of downstream signals received at the uplink transceiver circuit 202.

In some embodiments, both the uplink transceiver circuit 202 and the one or more access transceiver circuits 204 may be configured to process the set of downstream data signals received at the uplink transceiver circuit 202. For example, in some embodiments, the uplink transceiver circuit 202 may be configured to decode the set of downstream data signals received at the uplink transceiver circuit 202. Further, the one or more access transceiver circuits 204 may be configured to encode the set of downstream data signals (at the output of the uplink transceiver circuit 202) again, prior to providing the set of downstream data signals to the one or more access circuits. In some embodiments, utilizing multiple access transceiver circuits 204 enables to use different profiles and transmission modes for the links (to the access circuits) associated therewith, as the different access transceiver circuits are decoupled from one another. Although the FIG. 1 is explained herein with reference to communication in the downstream direction, the HFC network 300 also supports communication in the upstream direction from the cable modems to the CMTS circuit 102.

Figure 3A:
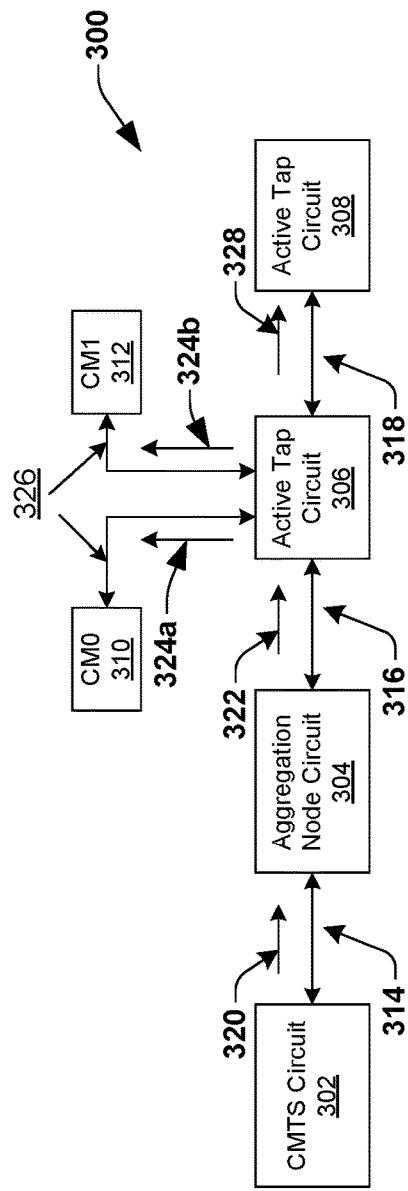
FIG. 3a illustrates a simplified block diagram of an HFC network comprising an active tap circuit, according to another embodiment of the disclosure.

FIG. 3a illustrates a simplified block diagram of an HFC network 300, according to another embodiment of the disclosure. The HFC network 300 comprises a CMTS circuit 302, a aggregation node circuit 304, a first active tap circuit 306 and a second active tap circuit 308. In some embodiments, the aggregation node circuit 304 is configured to receive a set of downstream data signals 320 from a CMTS circuit 302 over a fiber link 314 comprising one or more fiber optic cables and process the set of downstream data signals 320, in order to form a set of downstream data signals 322. In some embodiments, the CMTS circuit 302 comprises a transceiver or a communication device that is located at a head end or a central office of the HFC network 100. In some embodiments, the aggregation node circuit 304 comprises an active node circuit comprising a transceiver or a communication device that is located away from the head end (closer to the subscribers) and is configured to couple to the CMTS circuit 302 over the fiber link 318.

In some embodiments, the aggregation node circuit 304 is further configured to provide the set of downstream data signals 322 to the active tap circuit 306 over a coax cable circuit 316. In some embodiments, the aggregation node circuit 304 comprises an extended spectrum data over cable service interface specification (ESD) node configured to communicate with the active tap circuit 306 using an ESD transmission scheme (e.g., with 3 GHz bandwidth). In some embodiments, the coax cable link 316 comprise one or more coax cables. In some embodiments, the set of downstream data signals 322 comprises a processed version of the set of downstream data signals 320. In particular, in some embodiments, the set of downstream data signals 320 comprises optical signals and the set of downstream data signals 322 comprises electrical signals. In this embodiment, the aggregation node circuit 304 is shown to provide the set of downstream data signals 322 to a single active tap circuit 306 over the coax cable link 316. However, in other embodiments, the aggregation node circuit 304 may be configured to provide the set of downstream data signals 322 to one or more active tap circuits (not shown for clarity) over coax cables. In some embodiments, a splitter circuit (not shown) may be utilized to split the set of downstream data signals 322 between the one or more active tap circuits.

In some embodiments, the active tap circuit 306 is configured to couple to the aggregation node circuit 304 over the coax cable link 316 and receive the set of downstream data signals 322 from the aggregation node circuit 304 over the coax cable link 316. In some embodiments, the active tap circuit 306 comprises an active node circuit comprising one or more processors/transceivers configured to process/amplify data signals. In some embodiments, the active tap circuit 306 is further configured to provide a set of downstream data signals 324a and 324b to the cable modems CM0 310 and CM1 312, respectively, coupled to the active tap circuit 306 over a coax cable link 326 comprising one or more coaxial cables. In some embodiments, the set of downstream data signals 324a and 324b comprises all signals (or a processed version of all signals) associated with the set of downstream data signals 322. Alternately, in some embodiments, the set of downstream data signals 324a and 324b comprises a first subset (or a processed version of a first subset) of the set of downstream data signals 322. In some embodiments, processed version of the set of downstream signals (one or more) comprises an amplified/noise corrected version of the set of downstream signals. In some embodiments, the active tap circuit 306 performs one or more physical layer functions like modulation, signal processing, amplifying, encoding/decoding etc. on one or more downstream signals of the set of downstream data signals 322, using the transceivers/processors associated therewith, to form the set of downstream data signals 324a and 324b. In some embodiments, the active tap circuit 306 enables to recover the signal quality, remove noise etc. associated with the set of downstream data signals 322. In some embodiments, there is no power supply available at the position of the active tap circuits 306 and 308. In such embodiments, the power supply is provided to the active tap circuits 306 and 308 from the subscriber sides (e.g., from the modems CM0 and CM1).

In addition, in some embodiments, the active tap circuit 306 is further configured to be coupled to a subsequent tap circuit 308 and provide a set of downstream data signals 328 to the subsequent active tap circuit 308. In some embodiments, the set of downstream data signals 328 comprises a second subset of the set of downstream data signals 322 associated with the aggregation node circuit 304. Therefore, in such embodiments, the active tap circuit 308 is configured to couple to the aggregation node circuit 304 via the preceding active tap circuit 306.

Figure 3B:
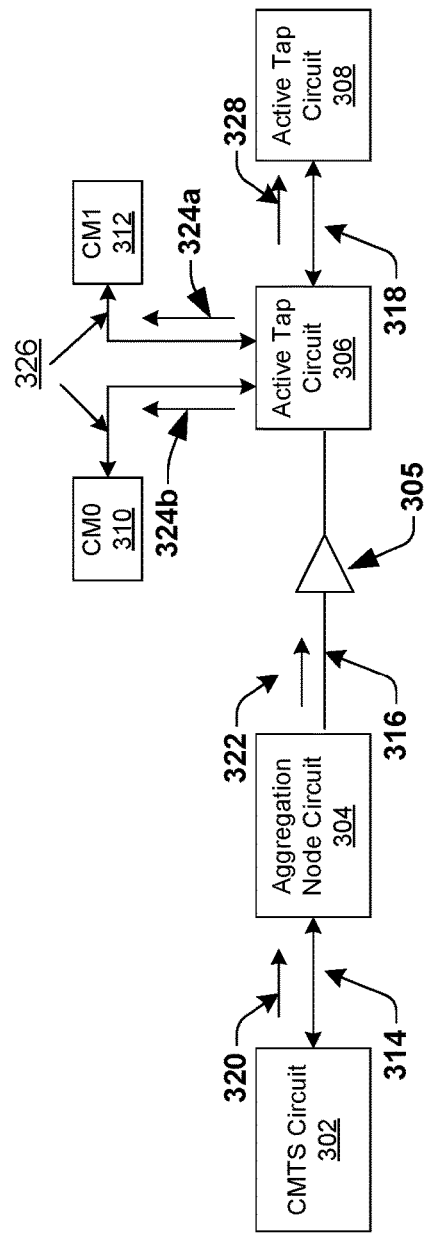
FIG. 3b depicts an HFC network comprising a trunk amplifier coupled between the aggregation node circuit and the active tap circuit, according to another embodiment of the disclosure.

In this embodiment, the active tap circuit 306 is configured to couple to the aggregation node circuit 304 over the coax cable link 316 comprising a passive link with no trunk amplifiers in between. However, in other embodiments, the active tap circuit 306 may be configured to couple to the aggregation node circuit 304 over an active coax cable link 316 comprising one or more trunk amplifiers coupled in between as depicted in FIG. 3b. In particular, FIG. 3b depicts an HFC network 350 comprising a trunk amplifier 305 coupled between the aggregation node circuit 304 and the active tap circuit 306. All the other features of the HFC network 350 is similar to the features associated with the HFC network 300 and is therefore not repeated herein.

Figure 3C:
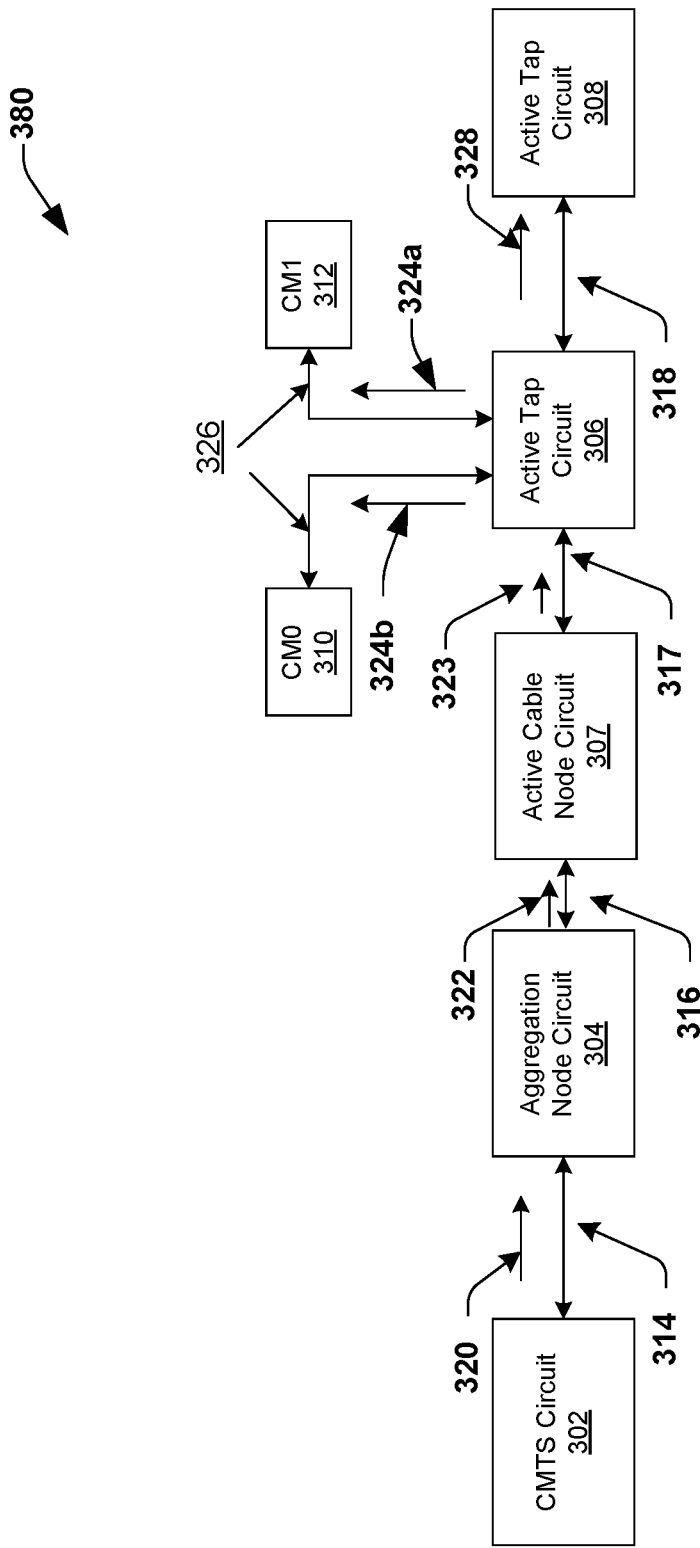
FIG. 3c depicts an HFC network comprising an active cable node circuit coupled between the aggregation node circuit and the active tap circuit, according to another embodiment of the disclosure.

Referring back to FIG. 3a, in this embodiment, the active tap circuit 306 is configured to be coupled to the aggregation node circuit 304 over the coax cable link 316. However, in other embodiments, the active tap circuit 306 may be configured to couple to an active cable node circuit 305 as depicted in FIG. 3c. In particular, FIG. 3c depicts an HFC network 380 comprising an active cable node circuit 307 coupled between the aggregation node circuit 304 and the active tap circuit 306. Therefore, in this embodiment, the active tap circuit 306 and the active tap circuit 308 are configured to couple to an active node circuit comprising the active cable node circuit 307, instead of the aggregation node circuit 304 (as depicted in FIGS. 3a and 3B above). Further, in this embodiment, therefore, the active tap circuit 306 is configured to receive a set of downstream data signals 323 from the active cable node circuit 307 over the coax cable link 317. In some embodiments, the set of downstream data signals 323 comprises a processed/amplified version of the set of downstream data signals 322. In some embodiments, the active cable node circuit 307 is similar to the active cable node circuit 106 in FIG. 1 and therefore, all the features applicable to the active cable node circuit 106 in FIG. 1 is also applicable herein. Further, since the active cable node circuit 307 is coupled to the active tap circuit 306, in some embodiments, the access transceiver circuit 204 in FIG. 2 (that is associated with an active cable node circuit) may be configured to couple to one or more access circuits comprising active tap circuits.

In some embodiments, the active tap circuit 306 and the active tap circuit 308 comprise one or more transceiver circuits, as illustrated in FIGS. 4a and 4b. In particular, FIG. 4a illustrates a simplified block diagram of an active tap circuit 400, according to one embodiment of the disclosure. In some embodiments, the active tap circuit 400 can be included within the active tap circuit 306 in FIG. 3a, FIG. 3b and FIG. 3c. Therefore, the active tap circuit 400 is explained herein with reference to the active tap circuit 306 in FIG. 3a, FIG. 3b and FIG. 3c. Alternately, in other embodiments, the active tap circuit 400 may be included within the active tap circuit 308 in FIG. 3a, FIG. 3b and FIG. 3c. The active tap circuit 400 comprises an uplink transceiver circuit 402 and an access transceiver circuit 404 that is coupled to the uplink transceiver circuit 402. Although not shown, the active tap circuit 400 may further comprise one or more processors/memory circuit coupled to or as part of the uplink transceiver circuit 402 and the access transceiver circuit 404. In some embodiments, the uplink transceiver circuit 402 comprises a point to multi point transceiver. In some embodiments, the access transceiver circuit 404 comprise one or more access transceiver circuits coupled to the uplink transceiver circuit 402. In some embodiments, each of the one or more access transceiver circuits comprises a point to multipoint (P2MP) transceiver. Alternately, in other embodiments, each of the one or more access transceiver circuits associated with the access transceiver circuit 404 comprises a point to point (P2P) transceiver, as depicted in FIG. 4b. In particular, FIG. 4b illustrates a simplified block diagram of an active tap circuit 450 comprising 3 P2P access transceiver circuits 404a, 404b and 404c.

In some embodiments, the active tap circuit 400 further comprises a coupler circuit 406 configured to split a transmission path from an active node circuit (e.g., the aggregation node circuit 304 in FIG. 3a or the active cable node circuit 305 in FIG. 3c) in to a first link towards the uplink transceiver circuit 402 and to a second link towards a subsequent active tap circuit. In particular, the coupler circuit 406 is configured to couple the upstream transmitter circuit 420 and a subsequent active tap circuit to the active node circuit. Specifically, the coupler circuit 406 is configured to couple to a first coax cable link 408 at a first end and to the uplink transceiver circuit 402 at a second, different end, in order to couple the uplink transceiver circuit 402 to the active node circuit. Further, the coupler circuit 406 is configured to couple to a subsequent active tap circuit at a third, different end, over a coax cable link 410 comprising coaxial cables, in order to couple the subsequent active tap circuit to the active node circuit. In some embodiments, for example, when the active tap circuit 400 is included within a subsequent active tap circuit (e.g., the active tap circuit 308 in FIG. 3a), the coupler circuit 408 is configured to be coupled to a coupler circuit of a preceding active tap circuit (e.g., the active tap circuit 306 in FIG. 3a) over the first coax cable link 408, in order to couple the uplink transceiver circuit 402 to the active node circuit.

In some embodiments, the uplink transceiver circuit 402 is configured to couple to an active node circuit comprising a aggregation node circuit (e.g., the aggregation node circuit 304 in FIG. 3a) over the first coax cable link 408 (e.g., the coax cable link 316 in FIG. 3a) comprising coaxial cables and configured to receive a set of downstream data signals associated with a set of cable modem (CM) circuits (e.g., CM0 and CM1) associated therewith from the aggregation node circuit over the coaxial cables, via the coupler circuit 406. In particular, in such embodiments, the coupler circuit 408 is configured to provide the set of downstream data signals to the uplink transceiver circuit 402. In some embodiments, the set of downstream data signals provided by the coupler circuit 408 to the upstream data circuit 402 comprises a first subset of a set of downstream data signals (e.g., the set of downstream data signals 322 in FIG. 3a) received at the coupler circuit 408 from the aggregation node circuit over the first coax link 408. In some embodiments, the coupler circuit 408 is further configured to provide a second, different subset of the set of downstream data signals (e.g., the set of downstream data signals 322 in FIG. 3a) received at the coupler circuit 408 from the aggregation node circuit, to the subsequent active tap circuit (e.g., the active tap circuit 308 in FIG. 3a).

Alternately, in other embodiments, the uplink transceiver circuit 402 is configured to couple to an active node circuit comprising an active cable node circuit (e.g., the active cable node circuit 305 in FIG. 3c) over the first coax cable link 408 (e.g., the coax cable link 317 in FIG. 3c) comprising coaxial cables and configured to receive a set of downstream data signals associated with a set of cable modem (CM) circuits (e.g., CM0 and CM1) associated therewith from the active cable node circuit over the coaxial cables, via the coupler circuit 406. In particular, in such embodiments, the coupler circuit 408 is configured to provide the set of downstream data signals to the uplink transceiver circuit 402. In some embodiments, the set of downstream data signals provided by the coupler circuit 408 to the upstream data circuit 402 comprises a subset of a set of downstream data signals (e.g., the set of downstream data signals 323 in FIG. 3c) received at the coupler circuit 408 from the active cable node circuit over the first coax link 408. In some embodiments, the coupler circuit 408 is further configured to provide a second, different subset of the set of downstream data signals (e.g., the set of downstream data signals 323 in FIG. 3c) received at the coupler circuit 408 from the active cable node circuit, to the subsequent active tap circuit (e.g., the active tap circuit 308 in FIG. 3c).

In some embodiments, each of the one or more access transceiver circuits of the access transceiver circuit 404 is configured to couple to the uplink transceiver circuit 402 at a first end, and couple to one or more CM circuits of the set of CM circuits (e.g., CM0 and CM1) over coax cables (e.g., the coax cable link 326 in FIG. 3a) at a second different end, in order to provide a set of downstream data signals (e.g., the set of downstream signals 324a and 324b) to the set of CM circuits, respectively. In some embodiments, the set of downstream signals provided to the one or more CM circuits from the access transceiver circuit 404 comprises a processed version of the set of downstream data signals received at the uplink transceiver circuit 402. In some embodiments, processed version of the set of downstream signals comprises an amplified/noise corrected version of the set of downstream data signals.

In some embodiments, both the uplink transceiver circuit 402 and the one or more access transceiver circuits 404 may be configured to process the set of downstream data signals received at the uplink transceiver circuit 402. For example, in some embodiments, the uplink transceiver circuit 402 may be configured to decode the set of downstream data signals received at the uplink transceiver circuit 402. Further, the one or more access transceiver circuits 404 may be configured to encode the set of downstream data signals (at the output of the uplink transceiver circuit 402) again, prior to providing the set of downstream data signals to the set of CM circuits, respectively. In some embodiments, utilizing multiple access transceiver circuits 404 enables to use different profiles and transmission modes for the links (to the CM circuits) associated therewith, as the different access transceiver circuits are decoupled from one another. Although the FIGS. 3a, 3b and 3c are explained herein with reference to communication in the downstream direction, the HFC network 300, 350 and 380 also supports communication in the upstream direction from the cable modems to the CMTS circuit 302.

Referring back to FIG. 1, in some embodiments, due to the introduction of the active cable node circuit 106, latencies in the HFC network 100 may be increased. In particular, the two point to multipoint connections, one between the aggregation node circuit 104 and the active cable node circuit 106, and the other between the active cable node circuit 106 and the access circuits, may increase the latencies in the HFC network 100 if there is no co-ordination in resource allocation. Similarly, in FIG. 3c, in some embodiments, due to the introduction of the active tap circuit 306, latencies in the HFC network 300 may be increased. In particular, the two point to multipoint connections, one between the aggregation node circuit 304 and the active tap circuit 306, and the other between the active tap circuit 306 and the CM circuits, may increase the latencies in the HFC network 300 if there is no co-ordination in resource allocation. Therefore, in order to reduce latency, in some embodiments, resource allocation for cable modems associated with the HFC network is performed centrally, within the CMTS circuit (e.g., the CMTS circuit 102 or 302) or the aggregation node circuit (e.g., the aggregation node circuit 104 or 304).

Again, referring back to FIGS. 1 and 3a, in the embodiments where a plurality of FDX nodes (e.g., active cable node circuit 106/active tap circuit 306) is to be supported by a aggregation node circuit (e.g., the aggregation node circuit 104 or 304), the aggregation node circuit may not have enough capacity to drive the plurality of FDX. Therefore, in some embodiments, the plurality of FDX nodes is grouped to form a set of node groups, each node group comprising one or more FDX nodes. A given node group can share the same DOCSIS FDX spectrum within the member nodes. Within a node group CMs can be treated as peers associated with the same node from MAC point of view. In some embodiments, the CMTS circuit/the aggregation node circuit can take advantage of network topology when doing sounding and interference group (IG) separation. In particular, CMs connected to different nodes in a given node group can be placed in different IGs. In some embodiments, the above grouping gives a very fluid network architecture in terms of network transformation in future. As MSOs takes fiber deeper into the network, node groups can be cut down in size eventually becoming single nodes when Coax backhaul capacity matches the aggregate capacity of nodes that it supports. Going even further, ESD-node can eventually become the final node and CMs can be upgraded from FDX-CMs to ESD-CMs to deliver ESD capacities to subscribers.

FIG. 5 illustrates a simplified block diagram of an apparatus 500 for use in an active node circuit associated with a wireline communication system, according to various embodiments described herein. In some embodiments, the apparatus 500 may be included within the aggregation node circuit 104 in FIG. 1 and the aggregation node circuit 304 in FIGS. 3a, 3b and 3c. Further, in some embodiments, the apparatus 500 may be included within the CMTS circuit, the active cable node circuit and the active tap circuits in FIG. 1, FIG. 3a, FIG. 3b and FIG. 3c. The apparatus 500 includes a processing circuit 510, a transceiver circuit 520 (which can facilitate communication of data via one or more networks in some aspects) and a memory circuit 530 (which can comprise any of a variety of storage mediums and can store instructions and/or data associated with at least one of the processor 510 or transceiver circuitry 520). In some embodiments, the transceiver circuit 520 may comprise one or more transceiver circuits. In some embodiments, the transceiver circuit 520 may include, inter alia, down-mixers, modulators/demodulators, filters, and A/D converters to convert the high frequency upstream communication to digital data, such as baseband data for example. Further, in some embodiments, the transceiver circuit 520 may include, inter alia, up-mixers, modulators/demodulators, filters, amplifiers and D/A converters to convert digital data, such as baseband data for example, to high frequency downstream communication.

In one embodiment, the transceiver circuitry 520 passes the digital data to the processing circuit 510. However, in other embodiments, the A/D conversion and the D/A conversion may take place within the processing circuit 510. In some embodiments, the transceiver circuit 520 can comprise a receiver circuit and a transmitter circuit. In some embodiments, the processing circuit 510 can include one or more processors. In some embodiments, the one or more processors can be integrated on a single chip. However, in other embodiments, the one or more processors can be embedded on different chips. In some embodiments, the memory circuit 530 comprises a computer readable storage device that includes instructions to be executed by the processor 510. In some embodiments, the memory circuit 530 can be an independent circuit and in other embodiments, the memory circuit 530 can be integrated on chip with the processor 510. Alternately, in other embodiments, the instructions to be executed by the processor 510 can be stored on a non-transitory storage medium like ROM, flash drive etc., and can be downloaded to the memory circuit 530 for execution. In some embodiments, the memory circuit 530 can comprise one or more memory circuits. In some embodiments, the one or more memory circuits can be integrated on a single chip. However, in other embodiments, the one or more memory circuits can be embedded on different chips.

Figure 6:
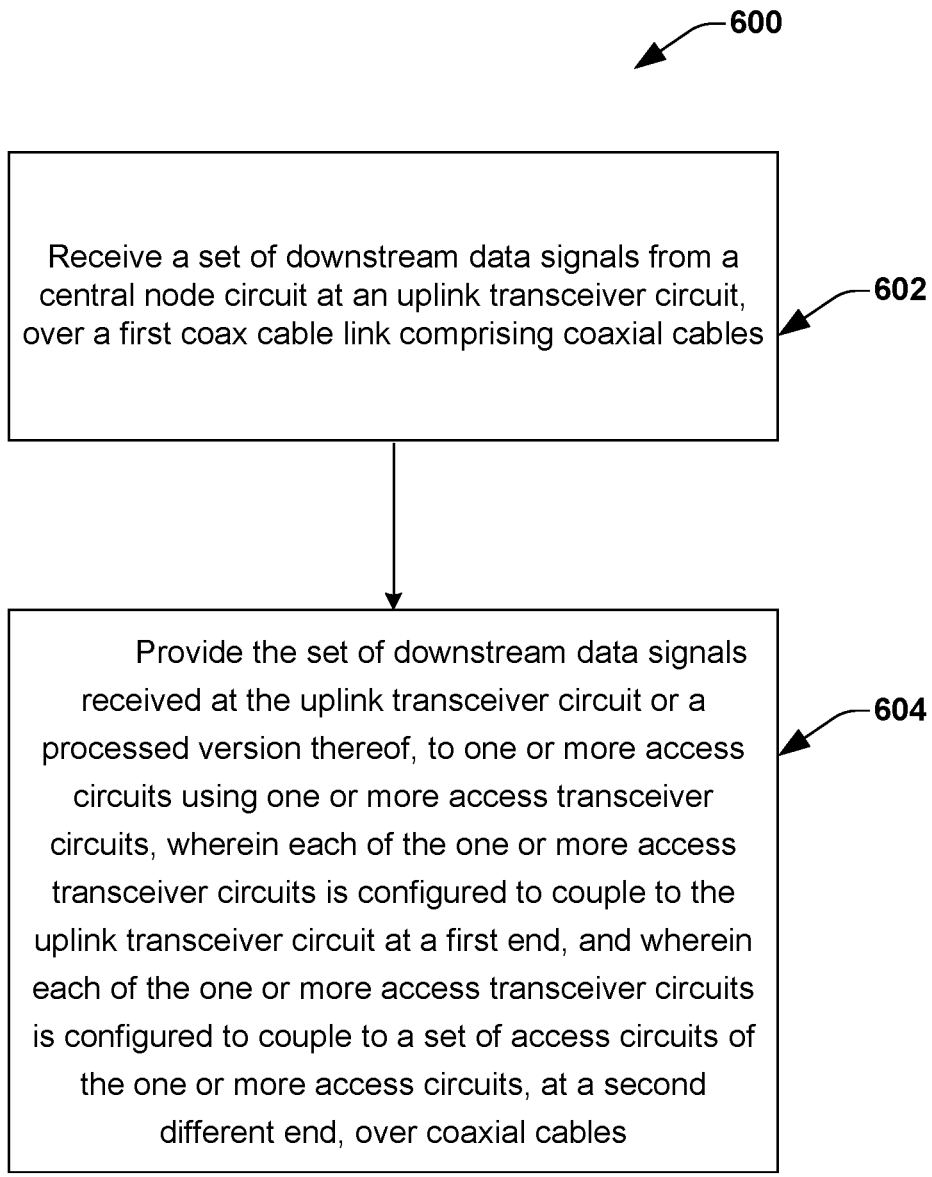
FIG. 6 illustrates a flow chart of a method of an active cable node circuit associated with an HFC network, according to one embodiment of the disclosure.

FIG. 6 illustrates a flow chart of a method 600 of an active cable node circuit associated with an HFC network, according to one embodiment of the disclosure. The method 600 is explained herein with reference to the active cable node circuit 200 in FIG. 2. In some embodiments, the active cable node circuit 200 may be included within the active cable node circuit 106 in FIG. 1 and the active cable node circuit 305 in FIG. 3c. Therefore, the method 600 is further explained herein with reference to the HFC network 100 in FIG. 1 and the HFC network 380 in FIG. 3c. At 602, a set of downstream data signals (e.g., the set of downstream data signals 126 in FIG. 1) is received from a aggregation node circuit (e.g., the aggregation node circuit 104 in FIG. 1), at the uplink transceiver circuit 202 over a first coax cable link 206 (e.g., the coax cable link 118 in FIG. 1) comprising coaxial cables. In some embodiments, the uplink transceiver circuit 202 comprises a point to multipoint transceiver.

At 604, the set of downstream data signals received at the uplink transceiver circuit 202 or a processed version thereof (e.g., the set of downstream data signals 128 in FIG. 1) is provided to one or more access circuits (e.g., the tap circuit 108 in FIG. 1) using one or more access transceiver circuits 204. In some the one or more access transceiver circuits 204 is configured to couple to the uplink transceiver circuit 202 at a first end, and wherein each of the one or more access transceiver circuits 204 is configured to couple to a set of access circuits of the one or more access circuits, at a second different end over coaxial cables. In some embodiments, the one or more access circuits comprise one or more cable modem (CM) circuits or one or more tap circuits, or both. Alternately, in some embodiments, the one or more access circuits comprise one or more active tap circuits (e.g., the active tap circuit 306 in FIG. 3c). In some embodiments, the one or more access transceiver circuits 204 comprise one or more point to multipoint transceivers, respectively. Alternately, in some embodiments, the one or more access transceiver circuits 204 comprise one or more point to point transceivers, respectively.

Figure 7:
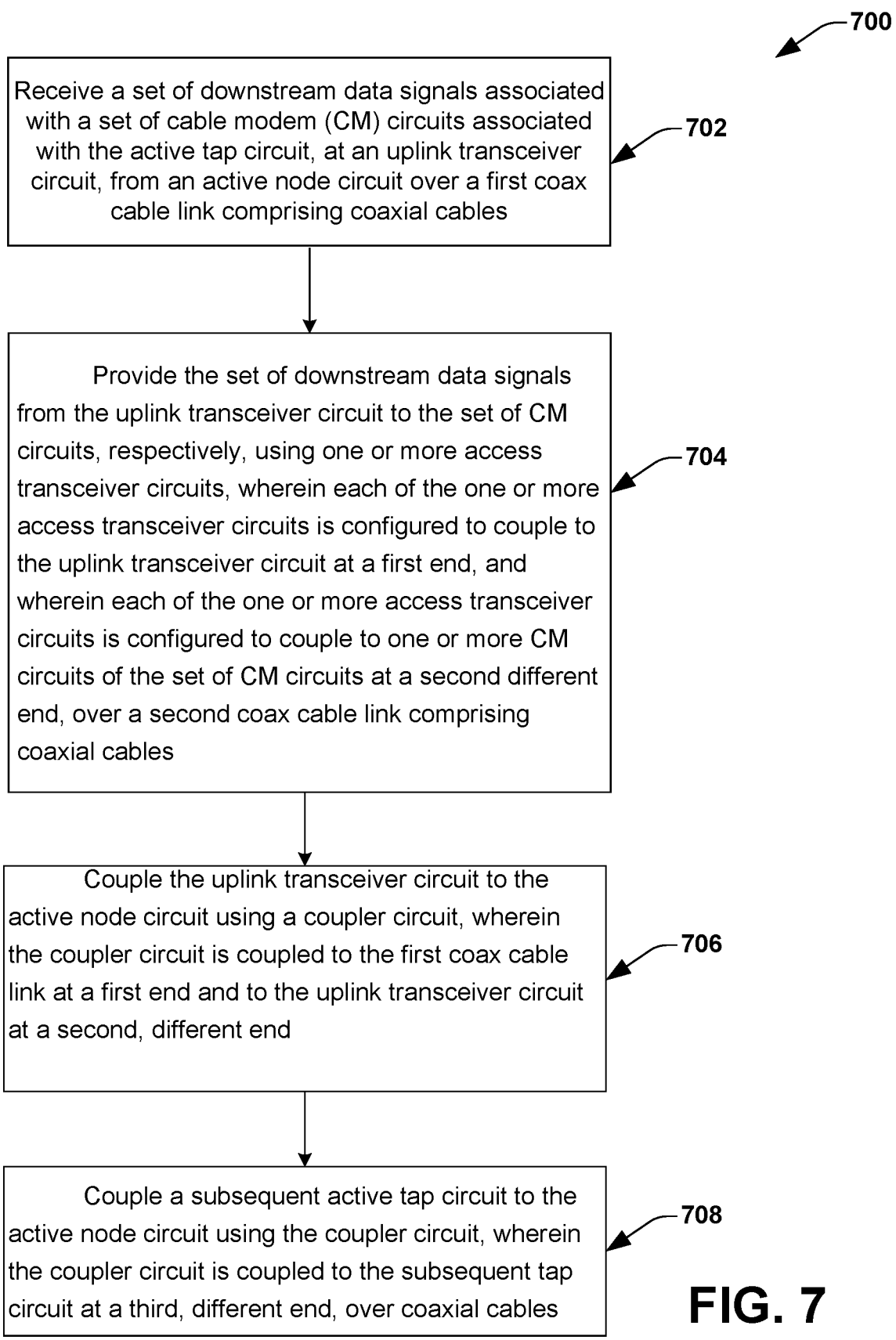
FIG. 7 illustrates a flow chart of a method of an active tap circuit associated with an HFC network, according to one embodiment of the disclosure.

FIG. 7 illustrates a flow chart of a method 700 of an active tap circuit associated with an HFC network, according to one embodiment of the disclosure. The method 700 is explained herein with reference to the active tap circuit 400 in FIG. 4a. In some embodiments, the active tap circuit 400 may be included within the active tap circuits 306 and 308 in FIGS. 3a, 3b and 3c respectively. At 702, a set of downstream data signals (e.g., a subset of the set of downstream data signals 322 in FIG. 3a) associated with a set of cable modem (CM) circuits (e.g., CM0 and CM1) associated with the active tap circuit 400, is received at the uplink transceiver circuit 402, from an active node circuit (e.g., the aggregation node circuit 304 in FIG. 3a or the active cable node circuit 305 in FIG. 3c) over a first coax cable link comprising coaxial cables (e.g., the coax cable link 316 in FIG. 3a or the coax cable link 317 in FIG. 3c).

At 704, the set of downstream data signals received at the uplink transceiver circuit 402 or a processed version thereof (e.g., the set of downstream data signals 324a and 324b in FIG. 3a), is provided to the set of CM circuits, respectively, using one or more access transceiver circuits 404. In some embodiments, each of the one or more access transceiver circuits 404 is configured to couple to the uplink transceiver circuit 402 at a first end, and wherein each of the one or more access transceiver circuits 404 is configured to couple to one or more CM circuits of the set of CM circuits at a second different end, over a second coax cable link 412 comprising coaxial cables (e.g., the coax link 326 in FIG. 3a and FIG. 3c). At 706, the uplink transceiver circuit 402 is coupled to the active node circuit using the coupler circuit 406, wherein the coupler circuit 406 is coupled to the first coax cable link 408 at a first end and to the uplink transceiver circuit 402 at a second, different end. At 708, a subsequent active tap circuit (e.g., the active tap circuit 308 in FIG. 3a and FIG. 3c) is coupled to the active node circuit using the coupler circuit 406, wherein the coupler circuit 406 is coupled to the subsequent tap circuit at a third, different end, over coaxial cables 410.

Figure 8:
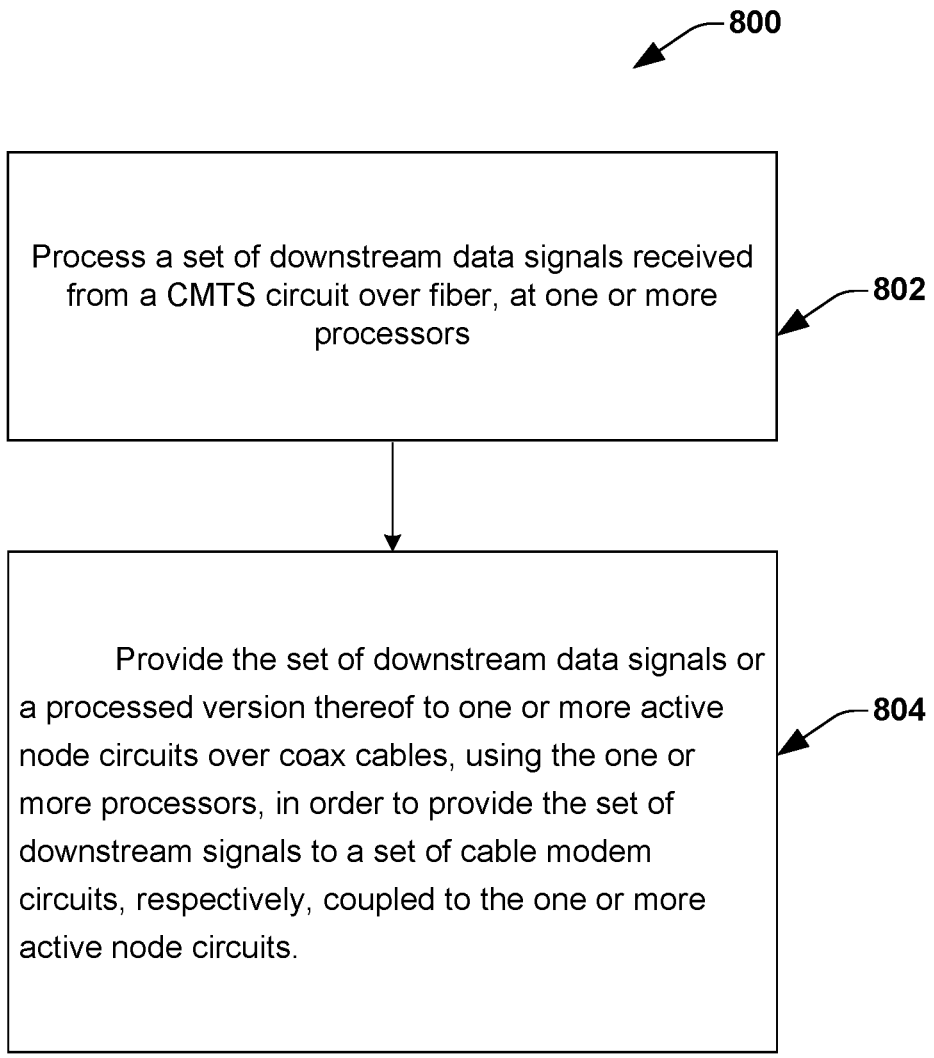
FIG. 8 illustrates a flow chart of a method of a aggregation node circuit associated with an HFC network, according to one embodiment of the disclosure.

FIG. 8 illustrates a flow chart of a method 800 of an aggregation node circuit associated with an HFC network, according to one embodiment of the disclosure. The method 800 is explained herein with reference to the apparatus 500 in FIG. 5. In some embodiments, the apparatus 500 may be included within the aggregation node circuits 104 and 304, in FIGS. 1, 3a, 3b and 3c respectively. At 802, a set of downstream data signals (e.g., the set of downstream data signals 124 in FIG. 1 or the set of downstream data signals 324 in FIG. 3a) received from a CMTS circuit (e.g., the CMTS circuit 102 in FIG. 1 or the CMTS circuit 302 in FIG. 3a) over fiber, via the transceiver circuitry 520, is processed at the one or more processors 510. At 804, a processed version of the set of downstream data signals (e.g., the set of downstream data signals 126 in FIG. 1 or the set of downstream data signals 322 in FIG. 3a) is provided to one or more active node circuits (e.g., the active cable node circuit 106 in FIG. 1 or the active tap circuit 306 in FIG. 1) over coax cables, from the one or more processors 510, using the transceiver circuitry 520, in order to provide the processed version of the set of downstream data signals to a set of cable modem circuits, respectively, coupled to the one or more active node circuits.

Figure 9:
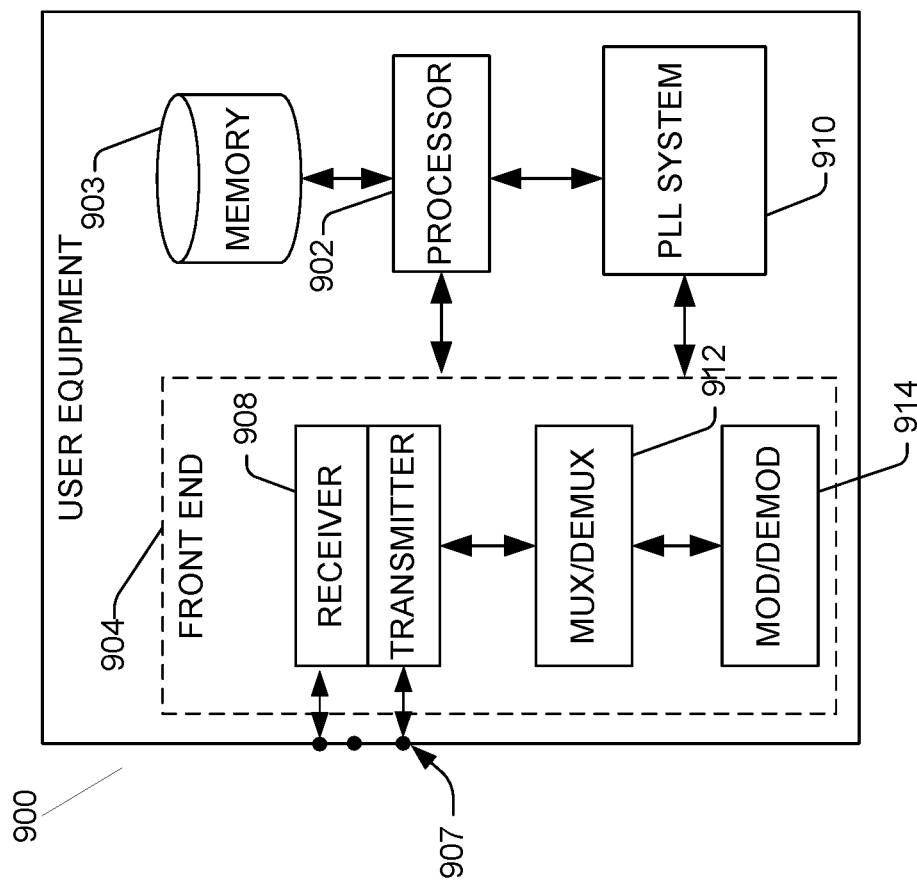
FIG. 9 illustrates a block diagram of an embodiment of device (e.g., a modem, a cable modem or gateway, etc.) related to access of a network (e.g., base station, wireless access point, femtocell access point, and so forth) that can enable and/or exploit features or aspects of the disclosed aspects.

To provide further context for various aspects of the disclosed subject matter, FIG. 9 illustrates a block diagram of an embodiment of device 900 (e.g., a modem, a cable modem or gateway, etc.) related to access of a network (e.g., base station, wireless access point, femtocell access point, and so forth) that can enable and/or exploit features or aspects of the disclosed aspects.

The device 900 can be utilized with one or more aspects (e.g., the CMTS circuit 102/302, the active cable node circuit 104/304, the active tap circuits 306 and 308, and the modem circuits CM0 and CM1) of communication networks described herein according to various aspects. The user device 900, for example, comprises a digital baseband processor 902 that can be coupled to a data store or memory 903 and a front end 904 (e.g., an RF front end, an acoustic front end, an optical front end, or the other like front end). The device 900 further comprises one or more input/output ports 907 configured to receive and transmit signals to and from one or more devices such as access points, access terminals, wireless ports, routers and so forth, which can operate within a radio access network or other communication network generated via a network device (not shown).

The device 900 can be a radio frequency (RF) device for communicating RF signals, an acoustic device for communicating acoustic signals, an optical device for communicating optical signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 904 can include a communication platform, which comprises electronic components and associated circuitry that provide for processing, manipulation or shaping of the received or transmitted signals via one or more receivers or transmitters (e.g. transceivers) 908, a mux/demux component 912, and a mod/demod component 914. The front end 904 is coupled to the digital baseband processor 902 and the set of input/output ports 907. The front end 904 may be configured to perform the remodulation techniques described herein to extend the frequency range of the device 900. In one aspect, the user equipment device 900 can comprise a phase locked loop system 910.

The processor 902 can confer functionality, at least in part, to substantially any electronic component within the mobile communication device 900, in accordance with aspects of the disclosure. As an example, the processor 902 can be configured to execute, at least in part, executable instructions that cause the front end to remodulate signals to selected frequencies. The processor 902 is functionally and/or communicatively coupled (e.g., through a memory bus) to memory 903 in order to store or retrieve information necessary to operate and confer functionality, at least in part, to communication platform or front end 904, the phase locked loop system 910 and substantially any other operational aspects of the phase locked loop system 910. The phase locked loop system 910 includes at least one oscillator (e.g., a VCO, DCO or the like) that can be calibrated via core voltage, a coarse tuning value, signal, word or selection process.

The processor 902 can operate to enable the mobile communication device 900 to process data (e.g., symbols, bits, or chips) for multiplexing/demultiplexing with the mux/demux component 912, or modulation/demodulation via the mod/demod component 914, such as implementing direct and inverse fast Fourier transforms, selection of modulation rates, selection of data packet formats, inter-packet times, etc. Memory 903 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an active cable node circuit associated with a hybrid fiber coax network, comprising an uplink transceiver circuit configured to couple to an aggregation node circuit over a first coax cable link comprising coaxial cables and configured to receive a set of downstream data signals from the aggregation node circuit over the first coax cable link; and one or more access transceiver circuits configured to provide the set of downstream data signals received at the uplink transceiver circuit or a processed version thereof, to one or more access circuits, wherein each of the one or more access transceiver circuits is configured to couple to the uplink transceiver circuit at a first end, and wherein each of the one or more access transceiver circuits is configured to couple to a set of access circuits of the one or more access circuits at a second, different end, and wherein each of the one or more access transceiver circuits is configured to couple to the set of access circuits over a second coax cable link comprising coaxial cables.

Example 2 is an active cable node circuit, including the subject matter of example 1, wherein the uplink transceiver circuit comprises a point to multipoint transceiver circuit.

Example 3 is an active cable node circuit, including the subject matter of examples 1-2, including or omitting elements, wherein the one or more access transceiver circuits comprises one or more point to multipoint transceiver circuits, respectively.

Example 4 is an active cable node circuit, including the subject matter of examples 1-3, including or omitting elements, wherein the first coax cable link and the second coax cable link comprise a passive link comprising no trunk amplifiers coupled thereon.

Example 5 is an active cable node circuit, including the subject matter of examples 1-4, including or omitting elements, wherein the one or more access circuits comprises one or more cable modem (CM) circuits or one or more tap circuits, or both.

Example 6 is an active cable node circuit, including the subject matter of examples 1-5, including or omitting elements, wherein the one or more tap circuits comprises active tap circuits.

Example 7 is an active cable node circuit, including the subject matter of examples 1-6, including or omitting elements, wherein the aggregation node circuit comprises an extended spectrum data over cable service interface specification (ESD) node.

Example 8 is an active cable node circuit, including the subject matter of examples 1-7, including or omitting elements, wherein the active cable node circuit comprises a PHY circuit configured to decode physical layer protocol associated with the network and forward media access control (MAC) layer protocol without changes.

Example 9 is an active tap circuit associated with a hybrid fiber coax network, comprising an uplink transceiver circuit configured to couple to an active node circuit, over a first coax cable link comprising coaxial cables and receive a set of downstream data signals associated with a set of cable modem (CM) circuits associated therewith, from the active node circuit over the first coax cable link; one or more access transceiver circuits configured to provide the set of downstream data signals received at the uplink transceiver circuit or a processed version thereof, to the set of CM circuits, respectively, over a second coax cable link comprising coaxial cables, wherein each of the one or more access transceiver circuits is configured to couple to the uplink transceiver circuit at a first end, and wherein each of the one or more access transceiver circuits is configured to couple to one or more CM circuits of the set of CM circuits at a second, different end, over the second coax cable link; and a coupler circuit configured to couple to the first coax cable link at a first end and to the uplink transceiver circuit at a second, different end, in order to couple the uplink transceiver circuit to the active node circuit.

Example 10 is an active tap circuit, including the subject matter of example 9, wherein the coupler circuit is further configured to couple to a subsequent active tap circuit at a third, different end, over coaxial cables, in order to couple the subsequent active tap circuit to the active node circuit.

Example 11 is an active tap circuit, including the subject matter of examples 9-10, including or omitting elements, wherein the coupler circuit is configured to couple to a coupler circuit of a preceding active tap circuit over the first coax cable link, in order to couple the uplink transceiver circuit to the active node circuit.

Example 12 is an active tap circuit, including the subject matter of examples 9-11, including or omitting elements, wherein the active node circuit comprises an aggregation node circuit or an active cable node circuit.

Example 13 is an active tap circuit, including the subject matter of examples 9-12, including or omitting elements, wherein the uplink transceiver circuit comprises a point to multipoint transceiver circuit.

Example 14 is an active tap circuit, including the subject matter of examples 9-13, including or omitting elements, wherein the one or more access transceiver circuits comprises one or more point to point transceiver circuits, respectively.

Example 15 is an active tap circuit, including the subject matter of examples 9-14, including or omitting elements, wherein the one or more access transceiver circuits comprises one or more point to multipoint transceiver circuits, respectively.

Example 16 is an active tap circuit, including the subject matter of examples 9-15, including or omitting elements, wherein the active tap circuit comprises a PHY circuit configured to decode physical layer protocol associated with the network and forward media access control (MAC) layer protocol without changes.

Example 17 is an aggregation node circuit associated with a hybrid fiber coax network, wherein the aggregation node circuit is configured to couple to a cable modem termination system (CMTS) circuit over fiber, the aggregation node circuit comprising a memory configured to store a plurality of instructions; and one or more processors configured to retrieve the plurality of instructions from the memory, and upon execution of the plurality of instructions is configured to process a set of downstream data signals received from the CMTS circuit over fiber, via a transceiver circuit; and provide a processed version of the set of downstream data signals to one or more active node circuits over coax cables, via the transceiver circuit, in order to provide the processed version of the set of downstream data signals to a set of cable modem circuits, respectively, coupled to the one or more active node circuits.

Example 18 is an aggregation node circuit, including the subject matter of example 17, wherein the one or more active node circuits comprises one or more active cable node circuits.

Example 19 is an aggregation node circuit, including the subject matter of examples 17-18, including or omitting elements, wherein the one or more active node circuits comprises one or more active tap circuits.

Example 20 is an aggregation node circuit, including the subject matter of examples 17-19, including or omitting elements, wherein the one or more active node circuits comprise full duplex (FDX) nodes that support FDX communication.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. An active cable node circuit associated with a hybrid fiber coax network, comprising:
   an uplink transceiver circuit configured to couple to an aggregation node circuit over a first coax cable link comprising coaxial cables and configured to receive a set of downstream data signals from the aggregation node circuit over the first coax cable link, the set of downstream data signals having been transmitted toward the aggregation node circuit as one or more data packets over a fiber link; and
   one or more access transceiver circuits configured to provide the set of downstream data signals received at the uplink transceiver circuit or a processed version thereof, to one or more access circuits, wherein each of the one or more access transceiver circuits is configured to couple to the uplink transceiver circuit at a first end, and wherein each of the one or more access transceiver circuits is configured to couple to a set of access circuits of the one or more access circuits at a second, different end, and
   wherein each of the one or more access transceiver circuits is configured to couple to the set of access circuits over a second coax cable link comprising coaxial cables.

2. The active cable node circuit of claim 1, wherein the uplink transceiver circuit comprises a point to multipoint transceiver circuit.

3. The active cable node circuit of claim 2, wherein the one or more access transceiver circuits comprises one or more point to multipoint transceiver circuits, respectively.

4. The active cable node circuit of claim 3, wherein the first coax cable link and the second coax cable link comprise a passive link comprising no trunk amplifiers coupled thereon.

5. The active cable node circuit of claim 3, wherein the one or more access circuits comprises one or more cable modem (CM) circuits or one or more tap circuits, or both.

6. The active cable node circuit of claim 5, wherein the one or more tap circuits comprises active tap circuits.

7. The active cable node circuit of claim 1, wherein the aggregation node circuit comprises an extended spectrum data over cable service interface specification (ESD) node.

8. The active cable node circuit of claim 1, wherein the active cable node circuit comprises a PHY circuit configured to decode physical layer protocol associated with the network and forward media access control (MAC) layer protocol without changes.

9. An active tap circuit associated with a hybrid fiber coax network, comprising:
   an uplink transceiver circuit configured to couple to an active node circuit, over a first coax cable link comprising coaxial cables and receive a set of downstream data signals associated with a set of cable modem (CM) circuits associated therewith, from the active node circuit over the first coax cable link, the set of downstream data signals having been previously transmitted toward an aggregation node circuit as one or more data packets over a fiber link;
   one or more access transceiver circuits configured to provide the set of downstream data signals received at the uplink transceiver circuit or a processed version thereof, to the set of CM circuits, respectively, over a second coax cable link comprising coaxial cables, wherein each of the one or more access transceiver circuits is configured to couple to the uplink transceiver circuit at a first end, and wherein each of the one or more access transceiver circuits is configured to couple to one or more CM circuits of the set of CM circuits at a second, different end, over the second coax cable link; and
   a coupler circuit configured to couple to the first coax cable link at a first end and to the uplink transceiver circuit at a second, different end, in order to couple the uplink transceiver circuit to the active node circuit.

10. The active tap circuit of claim 9, wherein the coupler circuit is further configured to couple to a subsequent active tap circuit at a third, different end, over coaxial cables, in order to couple the subsequent active tap circuit to the active node circuit.

11. The active tap circuit of claim 9, wherein the coupler circuit is configured to couple to a coupler circuit of a preceding active tap circuit over the first coax cable link, in order to couple the uplink transceiver circuit to the active node circuit.

12. The active tap circuit of claim 9, wherein the active node circuit comprises an aggregation node circuit or an active cable node circuit.

13. The active tap circuit of claim 9, wherein the uplink transceiver circuit comprises a point to multipoint transceiver circuit.

14. The active tap circuit of claim 9, wherein the one or more access transceiver circuits comprises one or more point to point transceiver circuits, respectively.

15. The active tap circuit of claim 9, wherein the one or more access transceiver circuits comprises one or more point to multipoint transceiver circuits, respectively.

16. The active tap circuit of claim 9, wherein the active tap circuit comprises a PHY circuit configured to decode physical layer protocol associated with the network and forward media access control (MAC) layer protocol without changes.

17. An aggregation node circuit associated with a hybrid fiber coax network, wherein the aggregation node circuit is configured to couple to a cable modem termination system (CMTS) circuit over fiber, the aggregation node circuit comprising:
  a memory configured to store a plurality of instructions; and
  one or more processors configured to retrieve the plurality of instructions from the memory, and upon execution of the plurality of instructions is configured to:
    process a set of packetized downstream data signals received from the CMTS circuit over fiber, via a transceiver circuit; and
    provide a processed version of the set of downstream data signals to one or more active node circuits over coax cables, via the transceiver circuit, in order to provide the processed version of the set of downstream data signals to a set of cable modem circuits, respectively, coupled to the one or more active node circuits, wherein a particular active node circuit of the one or more active node circuits comprises a physical layer (PHY) circuit configured to decode physical layer protocol and forward media access control (MAC) layer protocol.

18. The aggregation node circuit of claim 17, wherein the one or more active node circuits comprises one or more active cable node circuits.

19. The aggregation node circuit of claim 17, wherein the one or more active node circuits comprises one or more active tap circuits.

20. The aggregation node circuit of claim 17, wherein the one or more active node circuits comprise full duplex (FDX) nodes that support FDX communication.

* * * * *